United States Patent [19]

Franklin, III et al.

[11] Patent Number: 5,348,118
[45] Date of Patent: Sep. 20, 1994

[54] METHOD AND APPARATUS FOR INSTALLING FIBER OPTIC CABLE

[75] Inventors: William H. Franklin, III, Cranbury; John H. Samolyk, Forked River, both of N.J.

[73] Assignee: Bell Atlantic Network Services, Inc., Arlington, Va.

[21] Appl. No.: 938,840

[22] Filed: Sep. 4, 1992

[51] Int. Cl.$^5$ .............................................. H01R 43/00
[52] U.S. Cl. ...................... 182/187; 182/188; 174/84 R; 29/869
[58] Field of Search ............... 182/187, 188, 92, 2, 182/223, 150, 82; 174/84 R; 29/869-871

[56] References Cited

U.S. PATENT DOCUMENTS

| | | |
|---|---|---|
| 783,837 | 2/1905 | Johnston . |
| 1,206,574 | 11/1916 | Miller et al. . |
| 1,515,831 | 11/1924 | Bush ..................... 182/188 |
| 1,826,120 | 10/1931 | Booth .................. 182/187 X |
| 2,168,111 | 8/1939 | Barnes . |
| 3,776,498 | 12/1973 | Peters et al. . |
| 3,990,537 | 11/1976 | Swenson . |
| 4,427,092 | 1/1984 | Tentler . |
| 4,461,727 | 2/1987 | McKelvy . |
| 4,721,213 | 1/1988 | Eitel ..................... 182/24 |
| 4,730,700 | 3/1988 | Miller et al. . |

FOREIGN PATENT DOCUMENTS 191184  6/1937  Switzerland .................. 182/187

*Primary Examiner*—Alvin C. Chin-Shue
*Attorney, Agent, or Firm*—Lowe, Price, LeBlanc & Becker

[57] ABSTRACT

A method and apparatus for installing communications cable and splices in the cable. The method involves suspending the cable from poles so that a cable to be spliced terminates adjacent a desired pole in a loop of a length insufficient to reach the ground. A work platform assembly is installed on the pole in a position spaced from the platform and is leveled. A worker is suspended adjacent to the work platform on a support independent of the work platform. From the independent support a splicing device is mounted on the work platform, an end of the looped cable is organized in the splicing tool, the end of a second, third or fourth cable is organized in the splicing tool and the splice formed, all from the independent support. The support, worker, and work platform are then removed. The pole supported platform includes a planar work surface supported in an adjustable spaced relationship to the pole. The work platform is part of a collapsible assembly which is light in weight and adapted to support equipment but not workers.

9 Claims, 5 Drawing Sheets

METHOD AND APPARATUS FOR INSTALLING FIBER OPTIC CABLE

TECHNICAL FIELD

The present invention relates to the installation of fiber optic cable on utility poles and the splicing of such cable and more particularly to an improved light weight, portable, work platform uniquely adapted to mounting on telephone poles and serving as a work table for the splicing of fiber cable and to a method of such cable installation.

BACKGROUND ART

In the face of limited microwave frequency spectrum and radio's susceptibility to fading fiber optic or light wave technology is rapidly becoming the preferred method of digital transmission. Fiber optics overcome the disadvantages of microwave radio. It is inexpensive to manufacture, has vast bandwidth, is not susceptible to interference and fading, and communications can be conducted over a fiber optic system with almost complete assurance of privacy. Fiber optic cable is an important replacement for twisted pair cable because of its greater capacity and smaller physical diameter. On the other hand optical cable requires special tools and techniques for installation. The fibers must be carefully aligned into fixtures for either termination or splicing and requires special apparatus.

The presently used method for splicing fiber optic cable involves the use of a specially equipped truck. In a typical situation for installing aerial cables the cable is suspended from conventional poles and their supporting strands while leaving 50 feet or more of coiled cable at each pole at which a splice is to be constructed. This slack cable is then brought down into a splice truck or trailer. The splice is formed in the truck or trailer using a conventional splicing device and the cable is then suspended from the pole and strand. The suspended cable splice has coils at both sides thereof as required by the cable slack which permits the cable to be lowered into the truck.

Fiber cable splices are usually created either through a fusion process or the use of mechanical connectors. Each method has its advantages and disadvantages but it appears that the fusion method is evolving as the preferred method in view of the superior quality splice which results. Fusion splicers initially were very sensitive to environmental conditions which led to the use of an enclosed truck or trailer to provide the optimum portable environment. The trucks or trailers generally were insulated and air conditioned so that the loop could be uncoiled, run into the truck, sealed off and then manipulated on a well lit work bench. Originally the work bench and/or the truck or trailer required leveling to provide a stable, stationary, and level work surface.

Pursuant to that method the fibers were arranged in each end of the splice device, aligned under a microscope, and fusion performed. Subsequently some degree of automation was added and the splicing sets became less sensitive to atmospheric conditions. Humidity was originally a critical factor because of the use of an electric arc to create the heat necessary to melt the glass and improper atmospheric conditions could cause the arc to misfire or the creation of a poor fuse.

Currently available splice sets are much less sensitive to environmental conditions and are more automated. The microscope eye-piece has been eliminated in favor of a small video screen for making and checking alignments. Despite the foregoing, current fiber optic cable splicing still requires a significant amount of hand work and continues to require an extremely steady work surface. The cladding is still removed by hand and the individual fibers must be manually placed into a jig on both sides in order to permit the splice set to accomplish the necessary alignment. In the case of a loose tube cable, multiple fibers are removed from a tube and manually configured into a flat ribbon. They are then cut, cleaved, cleaned and inserted into the set to permit it to perform its process. One advantage of the current procedure is that it has made feasible the formation of fusion splices in an unconditioned environment.

Fiber optic cable splicing originally was performed on trunk cables so that the splices were spaced at 4–6,000 foot intervals. Current practice is to build distribution plants which involve terminals on every second, third or fourth pole and branch cable splices at frequent intervals very similar to the copper environment. The frequency of splicing is significantly greater than in the trunk only situation. Using the old splice technique this involves leaving coils of cable on every second or third pole in densely populated environments. Such a procedure is not only aesthetically objectionable but also relatively costly in view of the comparatively higher cost of fiber cable as compared to copper. Still further, productivity is poor in that it can require 15 minutes to half an hour to coil and store the slack once the splice is completed.

The initial approach to alleviating these problems involved attempting to splice in the air. Relying on conventional equipment the first approach was the use of a truck supported bucket or cherry picker with a work platform built or mounted onto the bucket. This proved unsatisfactory as it was found that the bucket constitutes a very unstable platform for work which is so sensitive to movement. The bucket is suspended from the vehicle chassis by suspension arms which inherently are subject to significant flexure. In addition it was found that unacceptable bucket movement could be caused by a slight amount of body movement by the operator. This tended to pull the fibers from the jigs and require rearrangement.

The next thought was to attempt to steady the bucket by attaching it to the strand or to a pole to provide a stable platform. However this would create a violation of accepted safety practices. The next approach was a revisiting of the use of the old wooden splicer's platforms that formerly were hung from the strand. However, the same type of problems were encountered. Every movement of the operator brings a resultant movement of the platform.

While platforms have been previously mounted on or suspended from telephone or power poles to permit work on equipment, these have conventionally constituted body support platforms to permit a worker on the platform to work on pole supported equipment. One typical pole platform of this type is illustrated in U.S. Pat. No. 2,168,111 issued Aug. 1, 1939 to R. C. Barnes. That patent shows a platform covered by a rubber pad mounted on a wooden pole through the use of burrs, a clamping chain, and a diagonal brace terminating in a "V" shaped pole engaging member for securement thereto by spurs or burrs. An alternate electrically insulated aerial platform for use by a lineman on utility poles is illustrated in U.S. Pat. No. 4,641,727 issued Feb. 10, 1987, to Marvin D. McKelvy. In that patent the platform presents a substantially flat upper surface where a lineman may stand, sit, or kneel and is provided with a railing assembly extending upwardly from the platform and terminating in a ring adapted to be connected to a lineman's safety belt. The platform is attached to the pole by insulating members so that the lineman on the platform is insulated from electrical connection to the pole.

A simpler version of a workman's platform for use by lineman in work on poles is shown in U.S. Pat. No. 783,837, issued Feb. 28, 1905, to R. G. Johnston. Another type of workman-supporting pole mounted platform is illustrated in U.S. Pat. No.3,775,498 issued Dec. 4, 1973, to Allen Peters, et al. In that patent there is shown a bracket for supporting scaffolding from a pole structure such as a pier or piling.

In addition to the foregoing it is common knowledge that there are available numerous forms of portable tree stands for use by hunters. Illustrative examples of such stands are found in U.S. Pat. Nos. 4,730,700 issued Mar. 15, 1988, to Miller et al.; 1,206,574 issued Nov. 28, 1916, to F. Miller; 3,990,537 issued Nov. 9,1976 to Gordon G. Swenson et al.; and 4,427,092 issued Jan. 24, 1984, to Lynn A. Tentler.

DISCLOSURE OF THE INVENTION

According to the present invention it has now been found that many of the previously discussed disadvantages of prior methods of forming fiber cable splices for suspension from poles may be eliminated or alleviated through the use of a relatively light weight, portable work platform adapted for pole mounting and supporting a work table which is spaced a substantial distance from the pole and preferably adjustable in position for convenient access by one or more operators supported in a bucket, ladder or like device. The platform is not constructed to support the weight of an operator nor is it designed in the manner of conventional lineman platforms.

The new platform and truck supported bucket or ladder can be used to form in the air splices to eliminate the unsightly, costly and labor-intensive coils previously utilized in the truck or trailer splicing procedure. The work table is supported on the platform at a substantial distance from the pole to permit formation of the splice at a distance from the pole mandated by applicable splice specifications, such as, for example, a minimum of 48 inches from the pole.

Adjustability is preferably provided so that the platform may be moved in a direction toward and away from the pole to provide maximum convenience to the operator while minimizing set up time. The platform is constructed of relatively light weight material, such as extruded aluminum, and preferably will not support the weight of an operator in the interest of minimizing the weight of the platform assembly.

The work surface is spaced from the pole at a distance significantly greater than the surfaces of previous workman support platforms or the like so that a construction which would support the weight of an operator at that distance from the pole would produce a device too heavy for effective utility. It has been found that with this arrangement the work surface may be leveled by eye and provides completely adequate stability for rapid and efficient formation of satisfactory splices by operators carried in a truck mounted bucket.

The present invention includes a new and improved and more economic and efficient methodology which provides numerous advantages. Pursuant to the new method the fiber cable is installed on the poles using approximately an eight foot or less coil of slack at each pole at which a splice is to be formed. This is in contrast to the current truck splicing methodology wherein the cable is hung with approximately a 50 foot coil of slack adjacent the pole. The conventional 50 feet permits forming the splice on the ground as described. Since the splice is formed on the ground and then suspended from the strand the cable must be recoiled on both sides of the splice.

According to the invention the workmen install the new platform on the pole in the conventional communication space which is usually approximately 18–20 feet up. The platform may be mounted in any suitable manner, and would normally be mounted with the assistance of the bucket or ladder in the case where such environment is available. The platform assembly is adjusted so that the work platform is in the vicinity of the coil approximately beneath the cable. Current regulations specify that this is approximately four feet from the pole. The workman is elevated in the bucket or ladder to the platform and mounts the splicing device or tool on the platform.

Generally speaking splices are formed to connect two main cable ends or to connect branch cables to a main cable or to connect the cable to an Optical Network Unit (ONU) which converts the optical signal to an electrical signal. The ONU is usually mounted either on the pole or suspended from the strand and is provided with a stub of cable with which the splice will be made. After setting up the splice platform the workman strips the cable sheath to expose the tubes or ribbons, exposes the fibers to be spliced, splices the fibers utilizing the appropriate splicing device mounted on the platform, and organizes the spliced fibers and unspliced tubes, ribbons or fibers in the splice case. The end of the branch cable or ONU stub, as the case may be, is handled in a like manner. Once the fibers are joined, all spliced and unspliced fibers, tubes or ribbons are stored in a splice case or closure utilizing the platform, the case or closure is removed from the platform and secured to the cable support strand. The workman and bucket or ladder platform may then be removed, the pole platform assembly lowered and the splice job is complete. Because of the complete isolation of the work platform from the workman's platform, i.e. the bucket or ladder, the inevitable movement of the bucket causes no interference with the efficient formation of satisfactory optical splices.

Accordingly it is an object of the present invention to provide an improved method and apparatus for installing fiber optic cable using aerial splices.

It is another object of the invention to provide an improved portable work table apparatus or assembly for removable mounting on a pole to permit the efficient creation of fiber cable splices by a workman independently supported or suspended adjacent the work table.

It is another object of the invention to provide an improved apparatus and method of installing fiber optic cable through the formation of aerial splices which reduce the length of cable required in splice formation.

It is another object of the invention to provide an improved apparatus and method for installing fiber optic cable which reduces the time necessary for forming splices which are to be supported from conventional telephone or utility poles and strands.

It is another object of the invention to provide an improved apparatus and method for forming aerial supported splices in fiber optic cable which eliminates the need for a specially equipped splice truck and/or the formation of splices on the ground.

It is another object of the invention to provide an improved method of installing communications cable wherein cable to be spliced is suspended from spaced utility poles so that a cable to be spliced terminates adjacent the desired pole in a loop of cable of a length insufficient to reach the ground, installing on such a pole a work platform assembly including a work platform spaced from the pole, leveling the platform, suspending a worker adjacent to the work platform on a support independent of the work platform, mounting a splicing device on the work platform, preparing the cable or cables for organizing and splicing in the splicing device, organizing the same in the splice case or closure, preparing additional cables to be spliced and organized within the splicing closure, organizing the same in the splicing device, and causing the splicing device to form a splice between the cables, followed by removal of the worker and worker support and removal of the work platform.

It is yet another object of the invention to provide a work platform assembly for temporary use when attached to a utility pole comprising a work platform having a generally planar work surface, an elongated support for the work platform which is removably attached to the pole, and an elongated brace pivotally attached to the support and removably attached to the pole, wherein the work surface has a dimension along a line which intersects the pole which is less than the spacing between the pole and the nearest edge or the work surface when the work platform assembly is attached to the pole in a working position.

It is yet another object of the invention to provide a work platform assembly of the foregoing type wherein the distance between the work table and pole is adjustable.

It is another object of the invention to provide a work platform assembly of the foregoing type wherein the elongated support comprises first and second portions slidably attached to one another to permit adjustment of the distance between the work table and pole.

It is another object of the invention to provide a work platform assembly of the foregoing type which is collapsible in two directions.

These and further objects and advantages of the invention will become apparent upon reference to the following specification, claims and appended drawings.

BEST MODE FOR CARRYING OUT THE INVENTION

Figure 1:
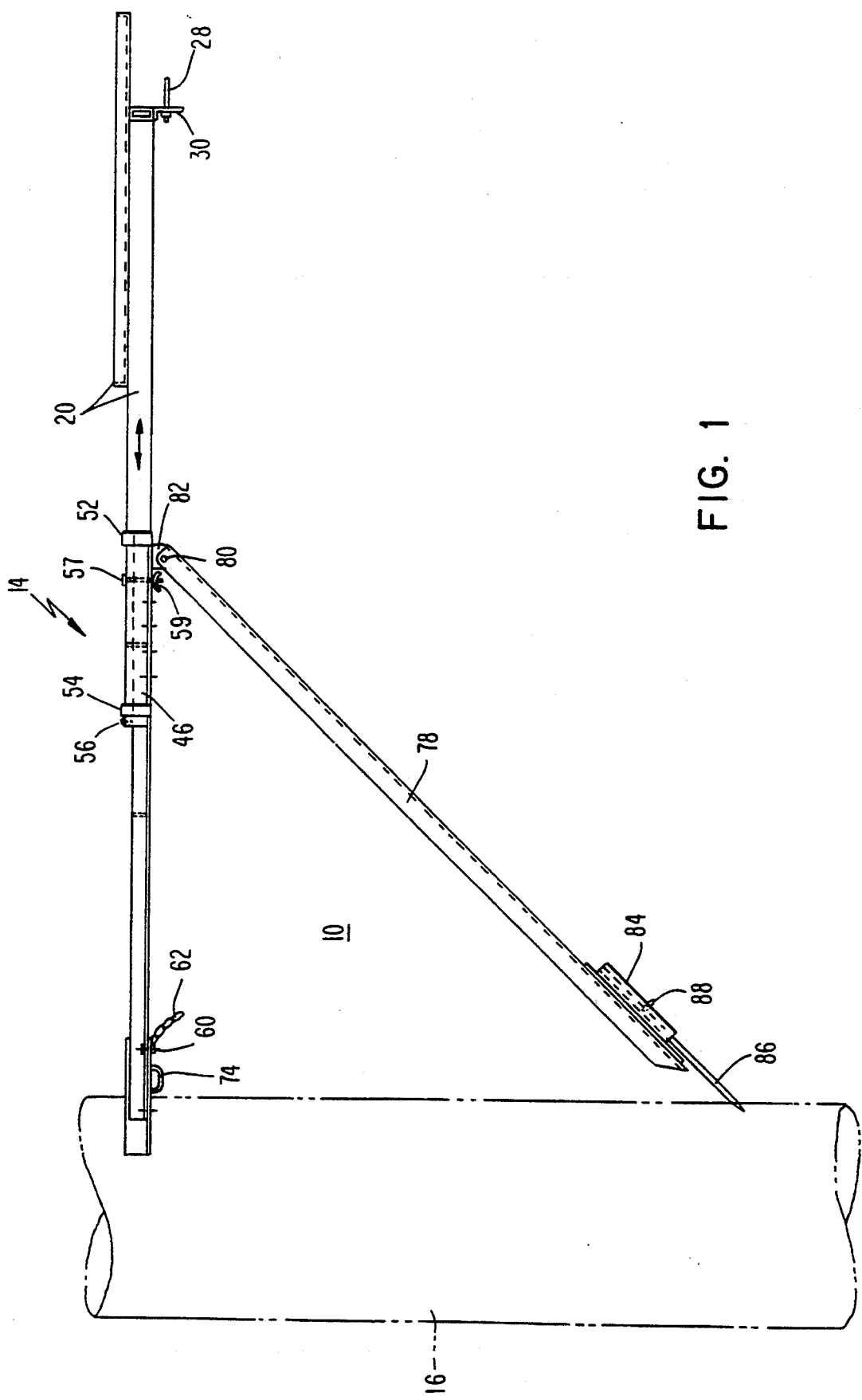
FIG. 1 is a side elevation of a work platform assembly constructed according to the invention mounted upon a utility pole shown in phantom.
Figure 2:
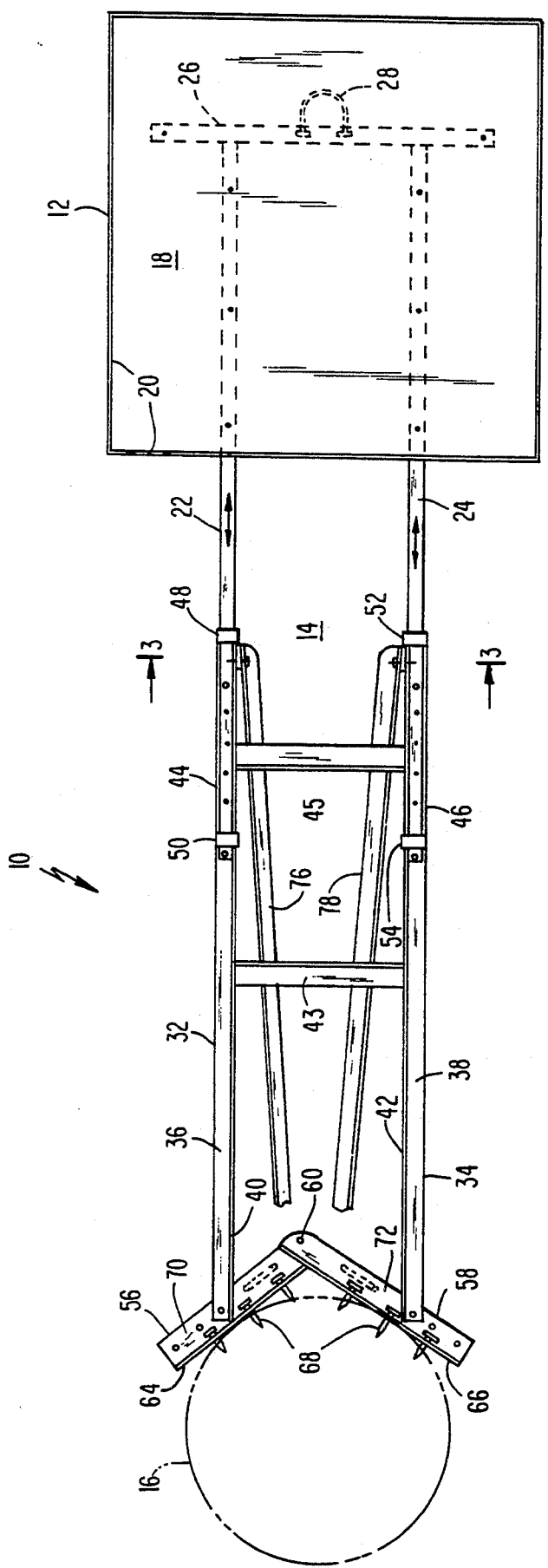
FIG. 2 is a top or plan view of the work platform assembly of FIG. 1 showing the utility pole in phantom.

Referring to FIGS. 1 and 2 there is shown generally at 10 a work platform assembly consisting of a work platform 12 mounted on an elongated support indicated generally at 14. The support 14 is attached temporarily to a utility or telephone pole shown in phantom at 16. The work platform 12 may preferably be formed of sheet aluminum which provides a rectangular work surface 18 bordered by upstanding flanges 20. A typical size for the work surface may be 30×30 inches.

The work table 12 is secured to a pair of extruded rectangular tubes or arms 22 and 24 and to a cross-brace 26 in any suitable manner, such as by spot welding. The tubes 22 and 24 and cross-brace 26 are preferably formed of rectangular aluminum tubing. The cross-brace 26 is welded to the ends of the tubes 22 and 24. A "U" bolt 28 is attached to the center of the cross-brace 26 by means of an angle 30 welded to the cross-brace. The "U" bolt facilitates handling of the work platform assembly in mounting and demounting on a pole.

Slidably attached to the rectangular arms 22 and 24 are a pair of aluminum angle bars 32 and 34 having horizontal flanges 36 and 38 and vertical flanges 40 and 42. The lower horizontal surfaces of the rectangular bars 22 and 24 are mounted for slidable movement over the upper horizontal surfaces of the horizontal flanges 36 and 38 in a manner to be described. The inner vertical surfaces of the bars 22 and 24 are adapted for slidable movement with respect to the vertical faces of the vertical flanges 40 and 42. The inside faces of the vertical flanges 40 and 42 are connected together by angle braces 43 and 45 which may be welded thereto.

Figure 3:
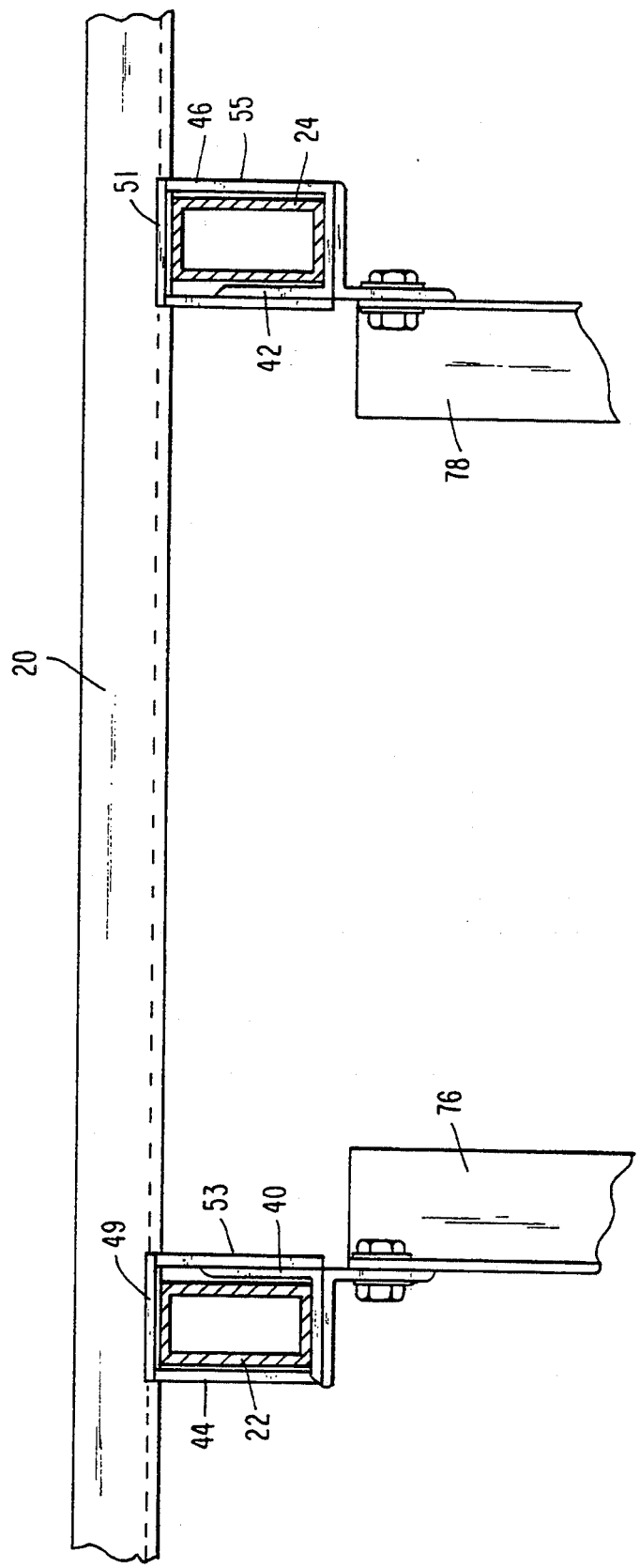
FIG. 3 is a vertical cross-section of the work platform assembly of FIGS. 1 and 2 taken on the line A—A in FIG. 2.
Figure 4:
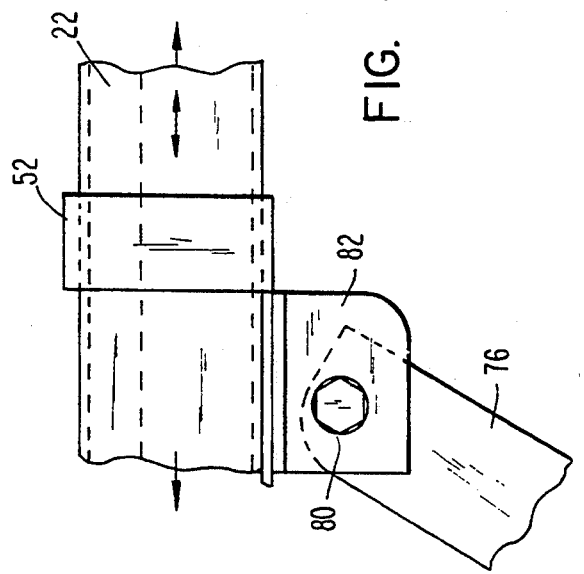
FIG. 4 is a side elevation of a detail of the guide or retainer to provide sliding movement between the two portions of the work table support.
Figure 7:
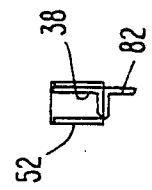
FIG. 7 is a vertical elevation detail of the guide or retainer as seen from the right end of FIG. 5.
Figure 6:
FIG. 6 is a top plan view of the arm shown in FIG. 5.
Figure 5:
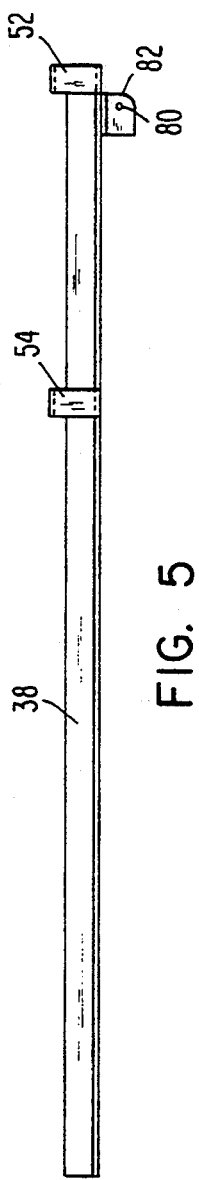
FIG. 5 is a side elevation of one arm of the portion of the support which is to be attached to the utility pole.
Figure 8:
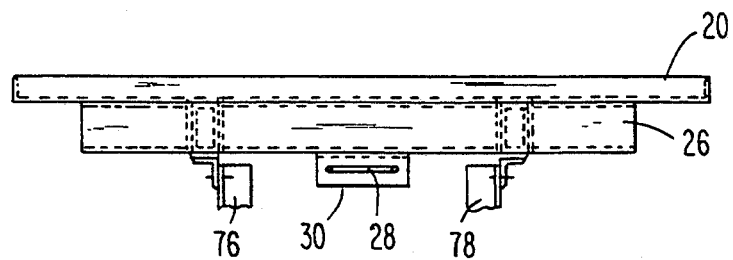
FIG. 8 s a vertical elevation of the work table as seen from the right end of FIG. 2.

Mounted at the right-most end of the angles 32 and 34 as seen in FIGS. 1-3 are upwardly extending outer side walls 44 and 46 welded to the upper surfaces of the horizontal flanges 36 and 38. These are illustrated in end view in FIGS. 3 and 7. Fastened to the ends of the vertical flanges 40 and 42 and to the side walls 44 and 46 are inverted "L" shaped clips or retainer members 48, 50, 52 and 54. These may be attached to the channels in any suitable fashion such as by spot welding. Referring to FIG. 3, these inverted L-shaped clips are formed of horizontal portions 49 and 51 welded to vertical portions 53 and 55. The circumference of the bars 22 and 24 is thus encircled at the clips to form spaced guides which permit sliding movement between the bars 22 and 24 and angles 32 and 34. The relationship of the bars to the angles and retainer clips is illustrated in detail in FIGS. 3 and 4.

Referring to FIG. 1, the bars 22 and 24 are provided at their left-most ends with stop bolts 56 mounted in threaded openings in the upper surface of the bars. The stop bolts 56 create a limit to the right-ward movement of the work table 12 when the stop bolts engage the retainer clips 50 and 54. Inward movement of the work table is limited by engagement of the inner-most flange of the work table with the end-most retainer clips 48 and 52 in FIGS. 1 and 2. The position of the work table may be locked by means of bolts 57 and wing nuts 59 which are mountable in spaced holes in the horizontal flanges 36 and 38 of the angles 32 and 34.

It is desirable that the inward motion of the work table be limited to a distance approximating the desired position of the splice which is now specified as a minimum of four feet. Accordingly the length of the angles 32 and 34 may be four feet. One reason for the specification of such a minimum distance is the possibility that the telephone pole may subsequently be replaced with an additional or substitute pole located to the right of the pole 16 in FIGS. 1 and 2.

Mounted on the inner ends of the angles 32 and 34 as best seen in FIG. 2 are a pair of steel angles 56 and 58 which are pivotally joined by a bolt 60. Attached to the bolt 60 is one end of a chain 62 for a purpose presently to be described. The vertical flanges 64 and 66 are provided with pole piercing burrs or spurs in the form of pointed bolts 68. Attached to the under side of the horizontal flanges 70 and 72 of the angles 56 and 58 are a pair of "U" rings 74 which may be secured in position by welding.

Figure 9:
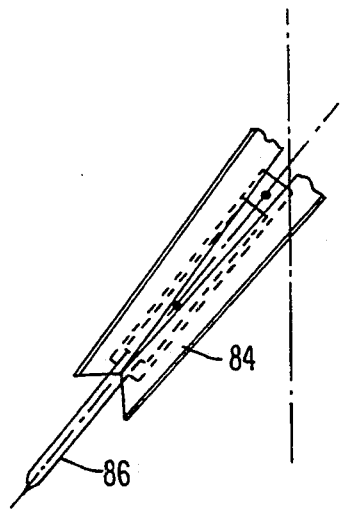
FIG. 9 is a plan view detail of the utility pole engaging end of the brace shown from the left of the brace end in FIG. 1.

Referring to FIGS. 1 and 2 a pair of brace angles 76 and 78 are pivotally attached to the right-most ends of the angles 32 and 34 by bolts 80 (FIG. 1) carried by angle clips 82 welded to the under surface of the horizontal flanges of the angles 32 and 34. The other ends of the angles 76 and 78 are welded together at their lower flanges as shown in FIG. 9. Beneath the flanges there is welded a tube 84 carrying a steel pin 86 for piercing the pole as shown in FIG. 1. The pin 86 is releasably locked in the tube 84 as by means of a lock bolt or set screw 88.

When the work platform assembly is mounted in position on the pole 16 as shown in FIGS. 1 and 2, the burrs 68 secure the left-most ends of the support angles 32 and 34, while the brace 78 is held in position by the steel pin 86. The burrs carrying angles 56 and 58 are held in position against the pole 16 by a suitable pole encircling belt or chain which is not shown.

The work table 18 may be leveled either by the initial placement of the work platform assembly or by adjustment of the steel pin 86 through use of the set screw 88. The chain 62 has its lower end, not shown, attached to the lower end of the brace 78, such as to a "U" bolt or eye in order to limit the lowermost position of the brace 78 and protect against uncontrolled slippage. The "U" bolts 28 and 74 provide means to assist in the handling of the platform assembly during raising and lowering as by means of a rope to the bucket or over a pulley on the pole or strand.

It will be appreciated that the work platform assembly is collapsible in the vertical sense as seen in FIG. 1 and also collapsible in the horizontal sense until the table 12 engages the clips 48 and 56. This arrangement facilitates mounting and demounting of the work platform assembly and transportation.

Figure 10:
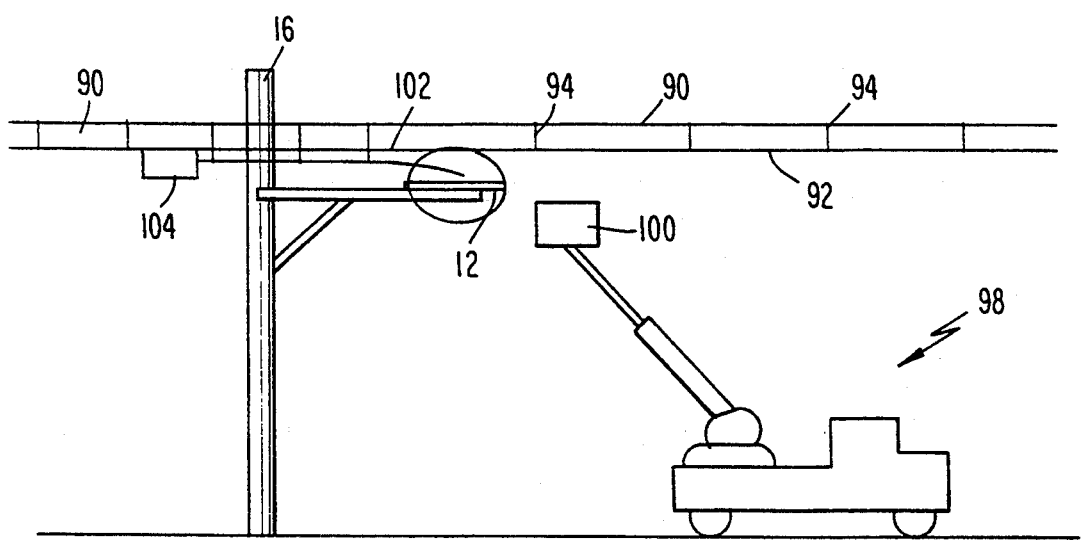
FIG. 10 is a diagrammatic illustration of a utility pole and strand showing the improved work platform assembly and a conventional bucket truck.

The method of the invention is now described. Referring to FIG. 10 there is shown a utility pole 16 having a strand 90 affixed thereto and extending to the next pole and beyond in conventional fashion. A fiber cable 92 is hung from the strand 90 by conventional fastening means 94 and may terminate in a loop 96 containing approximately 8 feet of cable or less. The cable 92 also may continue from the loop as shown at 93. The length of the loop is not critical but should be as short as possible and is shorter than the distance from the strand to the ground. It will be recalled that conventional ground level formation of splices requires a loop having a length more than twice the distance to the ground to permit handling in a truck.

The loop 96 is located at a distance of approximately four feet from the pole 16. Generally speaking the cable 92 is installed at one time by one crew with loops positioned at poles where splices are desired. A second crew (or the same crew) subsequently mounts the work platform assembly 10 on the pole with the work platform approximately a foot beneath the cable 92. The loop 96 may be pushed to the side of the platform. Present at this time is a bucket truck generally indicated at 98 carrying a bucket or ladder 100. The work platform assembly 10 may be installed in position using the bucket and either carrying the work platform assembly up in the bucket or hoisting the assembly from the bucket as by means of the "U" bolts 28 and 74. The work platform 12 is leveled as previously described. A worker is now suspended in the bucket adjacent to the work platform on a support independent of the work platform so that movement of the worker's support, such as the bucket, has no affect on the stability of the work platform 12. A conventional splicing tool or device is mounted on the work platform.

The worker on the independent support, in this case the bucket, thereupon prepares a portion of the loop or an end of the loop 96, as the case may be, for organizing in the splicing device. This generally entails removal of the sheath, separating the undesired tubes or strands from the desired strands and organizing the desired strands in the splicing tool. The same procedure is then repeated for the end of the cable to which the splice is to be made. As previously stated, this may comprise the end of a branch cable or a stub from an Optical Network Unit (ONU) mounted adjacent the pole 16 on the pole or strand 90. An exemplary ONU stub 102 is shown extending from an ONU 104 suspended from the strand 90. The splicing device is then actuated by the worker, the splice removed from the splicing device and encased. It will be understood that the slack is generally encased in the case. The case and the encased splice may then be secured to the strand 90. The splicing device is removed from the work platform 12 and the work platform assembly 10 is removed from the pole 16 and the job is complete. While the illustrated independent platform has been depicted as a bucket it may also constitute a truck mounted or sling mounted ladder 106 (shown in phantom).

It will be appreciated from the foregoing that the invention provides an improved method and apparatus for installing fiber optic cable in a time efficient and economic fashion using aerial splices. A portable work table assembly is provided for removable mounting on a pole to permit the efficient creation of fiber cable splices by a workman independently supported or suspended adjacent to the work table. The length of cable required in splice formation is reduced as is the time necessary to complete the suspension of the splice following its completion. The need for a specially equipped splice truck and ground formed splices is eliminated. The work platform assembly is collapsible in two directions and is of relatively light weight which is necessary if the work platform assembly is to be raised or supported by the bucket as is the case according to a preferred method of the invention.

It will be readily seen by one of ordinary skill in the art that the present invention fulfills all of the objects set forth above. After reading the foregoing specification, one of ordinary skill will be able to effect various changes, substitutions of equivalents and various other aspects of the invention as broadly disclosed herein. It is therefore intended that the protection granted hereon be limited only by the definition contained in the appended claims and equivalents thereof.

We claim:

1. A method of aerially splicing communications cable comprising the steps of:
   (a) mounting on a utility pole a work platform comprising:
      a work platform having a generally planar work surface; and
      means for temporarily attaching said platform to a pole including:
      elongated support means having a longitudinal axis having said platform attached at one end thereof and pole engaging means attached at the other end thereof; and
      elongated brace means pivotally attached to said support means intermediate the ends of said support means and having pole engaging means at an end of said brace means distal to said pivotal attachment;
      said work surface having a dimension along said longitudinal axis less than the distance between the most proximate portions of said pole and said work surface when said work platform is attached to a pole in a working position;
   (b) mounting a worker support platform adjacent to said work platform;
   (c) assembling at least two cables or cable ends to be spliced on said work platform in a splicing means; and
   (d) from said worker support platform completing said splice and disengaging said cable from said splicing means.

2. A method of aerially splicing communications cable comprising the steps of:
   (a) mounting at an elevated position on a utility pole a work platform having a generally planar work surface and elongated support means having a longitudinal axis with said platform attached at one end thereof and pole engaging means attached at the other end thereof, and elongated brace means pivotally attached to said support means intermediate the ends of said support means and having pole engaging means at an end of said brace means distal to said pivotal attachment; said work surface having a dimension along said longitudinal axis less than the distance between the most proximate portions of said pole and said work surface when said work platform is attached to a pole in a working position;
   (b) mounting a worker support platform in an elevated position adjacent to and independent of said utility pole said elevated work platform;
   (c) from said worker support platform assembling at least two cables or cable ends to be spliced on said work platform in a splicing means; and
   (d) from said worker support platform completing said splice and disengaging said cable from said splicing means.

3. A method of installing communications cable comprising the steps of:
   (a) suspending from spaced utility poles connected by a strand a communication cable terminating adjacent one of said poles in a loop of a length insufficient to reach the ground;
   (b) installing on said one pole a work platform assembly temporarily attached to said pole substantially adjacent to said loop, said work platform assembly including a work platform attached to said pole by support means with said work platform being spaced from said one pole;
   (c) leveling said work platform;
   (d) suspending a worker adjacent to said work platform on a support independent of said work platform and said one pole;
   (e) mounting splicing means on said work platform;
   (f) preparing a cable or cable end from said loop for organizing in said splicing means and organizing same in said splicing means;
   (g) preparing another cable to cable end to be spliced for organizing in said splicing means and organizing same in said splicing means; and
   (h) causing said splicing means to form a splice between said cable ends.

4. A method of installing communications cable according to claim 3 wherein said worker is suspended from a bucket truck.

5. A method of installing communications cable according to claim 3 wherein said cable end to be spliced comprises a stub from an Optical Network Unit (ONU).

6. A method of installing communications cable according to claim 3 wherein said cable end to be spliced comprises the end of a branch cable.

7. A method of installing communications cable according to claim 3 wherein said work platform on said work platform assembly is mounted on said support means for movement towards and away from said pole.

8. A method of installing communications cable comprising the steps of:
   (a) suspending from spaced utility poles connected by a strand a communication cable terminating adjacent one of said poles in a loop of a length insufficient to reach the ground;
   (b) installing on said one pole a work platform assembly temporarily attached to said pole, said work platform assembly including a work platform attached to said pole by support means with said work platform being spaced from said one pole so as to be disposed in a position adjacent to said loop;
   (c) leveling said work platform;
   (d) suspending a worker adjacent to said work platform on a support independent of said work platform and said pole;
   (e) from said support (i) mounting splicing means on said work platform, (ii) preparing an end of said cable from said loop for organizing in said splicing means and organizing same in said splicing means, (iii) preparing another cable end to be spliced for organizing in said splicing means and organizing same in said splicing means, and (iv) causing said splicing means to form a splice between said cable or cable ends.

9. A method of installing communications cable comprising the steps of:
   (a) suspending from spaced utility poles connected by a strand a communication cable terminating adjacent one of said poles in a loop of a length insufficient to reach the ground;

(b) installing on said one pole a work platform assembly temporarily attached to said pole, said work platform assembly including a work platform attached to said pole by support means with said work platform being spaced from said one pole so as to be disposed in a position adjacent to said loop and substantially level;

(c) suspending a worker adjacent to said work platform on a support independent of said work platform and said pole;

(d) from said support (i) mounting splicing means on said work platform, (ii) preparing an end of said cable from said loop for organizing in said splicing means and organizing same in said splicing means, (iii) preparing another cable end to be spliced for organizing in said splicing means and organizing same in said splicing means, and (iv) causing said splicing means to form a splice between said cable ends.

* * * * *